(12) United States Patent
Boot et al.

(10) Patent No.: US 6,740,391 B2
(45) Date of Patent: May 25, 2004

(54) PRODUCTION OF SHEET GLASS

(75) Inventors: George Allan Boot, Doncaster (GB); Julian Gould Barnes, Bodfari (GB)

(73) Assignee: Pilkinton plc, Merseyside (GB)

( * ) Notice: Subject to any disclaimer, the term of this patent is extended or adjusted under 35 U.S.C. 154(b) by 0 days.

(21) Appl. No.: 10/308,716

(22) Filed: Dec. 3, 2002

(65) Prior Publication Data

US 2003/0082394 A1 May 1, 2003

Related U.S. Application Data

(62) Division of application No. 09/528,292, filed on Mar. 17, 2000, now Pat. No. 6,510,708.

(30) Foreign Application Priority Data

Mar. 19, 1999 (GB) .............................................. 9906327

(51) Int. Cl.[7] .................................................. B32B 3/30
(52) U.S. Cl. ..................................................... 428/156
(58) Field of Search ......................................... 428/156

(56) References Cited

U.S. PATENT DOCUMENTS

| | | | | | |
|---|---|---|---|---|---|
| 2,115,433 A | * | 4/1938 | Soule | ............................. | 65/43 |
| 3,101,576 A | * | 8/1963 | Makovic | ....................... | 451/41 |
| 3,200,541 A | * | 8/1965 | Banti | .......................... | 451/261 |
| 3,442,748 A | * | 5/1969 | D'Huart | ...................... | 428/143 |
| 3,472,641 A | * | 10/1969 | Gray | ........................... | 65/30.1 |
| 3,672,859 A | * | 6/1972 | Classen | .......................... | 65/61 |
| 4,952,462 A | * | 8/1990 | Bright | ......................... | 428/105 |
| 5,224,978 A | * | 7/1993 | Hermant et al. | ............... | 65/94 |
| 5,434,006 A | * | 7/1995 | Goelff et al. | ................ | 428/142 |
| 5,843,546 A | * | 12/1998 | Eichhorn | ..................... | 428/156 |
| 6,352,759 B2 | * | 3/2002 | Savant | ........................ | 428/156 |

FOREIGN PATENT DOCUMENTS

GB   2 213 768 A   *   8/1989

* cited by examiner

Primary Examiner—Sean Vincent
(74) Attorney, Agent, or Firm—Marshall & Melhorn, LLC

(57) ABSTRACT

Novel processes for the production of a smooth translucent glass sheet comprise grinding at least one face of a clear glass sheet using a conventional abrasive such as sand. Preferably the clear glass sheet is a short of clear float glass. The process may be carried out using a conventional glass grinding and polishing facility operated in a manner that the ground sheet is ground but not polished. The product preferably has a satin finish and a roughness Ra of less than 5.0 $\mu M$ and is sufficiently translucent as to be useful in privacy glazing. The ground glass products may have a haze value of from 80 to 90% and an Ra value of from 1.0 $\mu M$ to 3.0 $\mu M$ are believed to be novel.

6 Claims, No Drawings

PRODUCTION OF SHEET GLASS

CONTINUING APPLICATION DATA

This application is a divisional application of U.S. patent application Ser. No. 09/528,292, filed on Mar. 17, 2000, now U.S. Pat. No. 6,510,708. U.S. patent application Ser. No. 09/528,292 is hereby incorporated by reference as if set forth in its entirety herein.

FIELD OF THE INVENTION

This invention relates to translucent smooth glass sleets, to novel processes for their production and to novel methods of operating a glass grinding and polishing production facility so as to produce translucent smooth lass sheets.

DESCRIPTION OF THE PRIOR ART

Translucent glass sheets find use in a variety of applications in which there is a need for light transmission coupled with a desire for a degree of privacy. Products of this type can be made by a variety of processes. Shot blasting processes are used to produce a translucent sheet product having a relatively rough surface. The roughness of the surface means that these products are not acceptable for all applications. Acid etching processes are used and produce a product having a relatively smooth surface. However acid etching processes present obvious safety and environmental hazards and are thereby expensive to operate. Rollin processes using an appropriate roller may also be used but produce a product with a relatively rough surface.

Clear smooth glass sheets are currently produced almost exclusively by the float glass process. Prior to the advent of the float glass process in the late 1950's clear smooth glass sheets were produced by grinding and polishing relatively rough glass plates. Typical grinding and polishing processes are described at page 705 of "The Handbook of Glass Manufacture" Volume II, edited by Fay V Tooley and published by Books for Industry, 777 Third Avenue, New York, N.Y. 10017. The use of glass grinding and polishing facilities to produce sheet glass is now largely confined to the production of glass products which cannot be produced using the float process. The most prominent example is the production of polished wired safety glass

SUMMARY OF THE INVENTION

We have now discovered a novel method for the production of a translucent glass sheet which comprises grinding at least one surface of a clear glass sheet with a suitable abrasive. These, methods may be and preferably axe carried out using an existing facility for the grinding and polishing of sheet glass. The clear glass sheet may be subjected to all or part of the grinding process but is not polished. The product of these grinding processes preferably have a smoothness close 10 that of acid etched glass. The ground surface has characteristics which distinguish those products from the acid etched glass sheets. Certain of those ground glass sheets are believed to be novel and these sheets comprise a second aspect of the invention.

DETAILED DESCRIPTION OF THE PREFERRED EMBODIMENT OF THE INVENTION

From one aspect this invention provides a process for the production of a translucent smooth glass sheet which comprises grinding at least one surface of a clear flat lass sheet under controlled conditions so as to produce a translucent sheet having a smoothness better than 50 $\mu$M Ra.

RA is a measure of roughness of the glass surface which is the arithmetic mean of the absolute departures of the roughness profile from the mean line. The translucent glass sheet will generally b, less smooth than the clear sheet from which it is produced. In is specification all measurements of the surface of the translucent glass sheet were obtained using a KSA Tencor P10 profiler (both to produce a three-dimensional image and a two-dimensional one line scan profile) unless specifically stated otherwise. A stylus having a radius of 0.1 $\mu$M was employed using a loading of 0.5 mg. The short range filter was maintained at the instrument's default setting of 8.3 $\mu$M corresponding to a scan rate of 50 $\mu$M per second and the data point sampling rate of 50 Hz. No long-range filter was employed. Three-dimensional images were recorded over an evaluation area of 250 $\mu$M×250 $\mu$M. Fifty scans were collected per image giving a scan line spacing of 5 $\mu$M. The two dimensional profiles were recorded over an evaluation length of 4 mm.

The ground glass sheets produced by the processes of this invention preferably have Ra values falling within the range 0.05 $\mu$M to 5.0 $\mu$M. Preferably they will have an Ra value falling within the range 0.05 $\mu$M to 3.0 $\mu$M or most preferably 0.1 $\mu$M to 2.0 $\mu$M.

The preferred type of clear flat glass sheet for use in the processes of this invention is a sheet of float glass. Float glass has a very smooth surface, better than 0.1 $\mu$M Ra and is widely available in a variety of thicknesses. In the preferred embodiments the clear float glass sheet will have a thickness of from 4 mm to 25 mm. Thinner sheets may be employed but are more liable to break during the grinding process. Thicker shots may be ground if desired. In a second preferred embodiment the clear flat glass sheet is a rolled wired glass sheet. Safety glazing with a wire grill insert is widely employed. Rolled wired flat glass is conventionally ground and polished so as to remove the pattern applied by the roller to produce a clear polished wired glass. In the processes of this invention the clear wired glass is ground under controlled conditions so as to produce a translucent wired glass. The clear wired flat glass generally has a thickness of from 5.0 to 8.0 mm.

The clear glass sheets will preferably be ground on one surface only. Both sides can be ground if necessary. The desirability of grinding on one or both sides will normally depend upon the intended use of the ground glass sheet.

The grinding process reduces the thickness of the glass sheet. In general grinding one face of a lass sheet will reduce the thickness of the sheet by approximately 0.5 mm.

The grinding process of this invention may be carried out by mounting the clear flat glass sheets upon a suitable flat and level table and passing them under a grinding head which is fed with a suitable abrasive medium. The grinding head may conveniently be made from cast iron. A wide variety of materials have been proposed for use as abrasives in lass grinding processes. Any of these abrasives are potentially useful in the processes of this invention. The most commonly used abrasive and the preferred abrasive in the processes of this invention is sand. The sand is fed to the grinding head in the form of an aqueous suspension of sand.

Normally the grinding operation will be carried out using a progressively finer abrasive during the process. The coarser more abrasive particles are fed to the initial stage of the grinding process and are replaced by finer particles as the grinding proceeds. The process may be carried out using two main variants of the production process. In the first variant the clear glass sheet is passed under a series of grinding heads each of which is fed with a specific grade of abrasive.

The abrasive particles from each stage are recovered, regraded and passed to a subsequent stage until they are too abraded to be of further use. In the second variant the glass sheet is placed under a single grinding head and a progressively finer grade of abrasive is fed to that head as the grinding progresses.

The nature of the abrasive, the pressure on the grinding head and the duration of the grinding process all have a significant effect upon the properties of the ground glass sheet which is produced. It is within the routine skill of the art to adjust these parameters in such a way as to produce the desired product. In particular the roughness of the ground side of the glass may be controlled to fall within the desired region.

The degree of translucency is influenced by the parameters of the grinding process and the process is controlled so as to produce a desired translucent product. For the intended purpose of privacy glazing the panels have a milky appearance which prevents an observer seeing an object on the far side of the glazing unless that object is immediately adjacent to the glazing.

The grinding processes of the present invention may impart novel characteristics to the surface of the class and lead to the production of novel glass sheets having new and useful properties.

Ground translucent float glass itself is believed to be novel and constitutes a further aspect of this invention.

The grinding processes may lead to the production of translucent glass sheet having a transmission of from 60 to 80%. In general glass ground on one side only may have a transmission of 70 to 80% and glass ground on both sides a transmission of 65 to 70%. Moreover the ground glass may have a haze value of from 80 to 95% and a clarity of from 5 to 20%. Glass sheets having a haze value of from 80 to 90% and an Ra value of less than $5.0\,\mu M$ are believed to be novel and comprise a further aspect of the invention.

The applicants associate these novel characteristics with the nature of the surface which is produced by the grinding process. One such parameter which can be measured and which appears to relate to these characteristics is the density of summits [Sds]; the number of summits in a unit sampling area. Typically the ground glass sheets of this invention have an Sds value of from 500 to 1000 per $mm^2$.

A second parameter is the Sa value. Sa is the arithmetic mean of the absolute values of the surface departures above and below the mean plane within the sampling areas. The ground glass sheets of this invention may have Sa values ranging from 0.3 to $40/\mu m$. The lower values within this range, e.g. 0.5 to $2.0/\mu m$ are typical of the novel products of this invention, particularly those which have been ground on one surface of the glass shot only.

A third parameter which may characterise the ground glass sheets of this invention is the Kurtosis value Sku which is a measure of the peakedness or sharpness of the surface height distribution. A perfectly random surface which have a Kurtosis value of 3.0. The ground sheets of this invention may have a Kurtosis value greater than 3.0, at least in some areas, which value indicates that the ground surface is a relatively spiky surface.

From another aspect this invention provides a novel method for the production of a translucent smooth glass sheet using a glass processing plant which comprises a grinding unit and a polishing unit which is characterised in that a sheet of clear flat glass is ground in the grinding unit and the ground translucent sheet is removed from the plant without being subjected to a polishing step. The sheet can be removed from the production line prior to the polishing step or it can be passed through the polishing equipment whilst that equipment is inactive and collected at the end of the production line.

When the grinding is complete the ground sheet is removed from the grinding head, washed and dried. The glass is then available for cutting and/or shipping. In handling the ground glass care should be taken to avoid marking. The ground surface since such marks are unsightly and can be difficult to remove. Conventional handling equipment can be employed and does not mark the glass.

The ground glass sheets produced by the processes of this invention may find use in a variety of applications. They are potentially useful as replacements to acid etched glass in most of the applications in which acid etched glass is currently employed.

The ground glass sheet produced by grinding one surface of a sheet of float glass finds use as a privacy glass e.g. as a shower screen and in particular as part of an article of furniture. Typically the ground glass sheets for use in this application may have a thickness of from 3 mm to 7 mm. Sheets having a thickness of 5 mm (after grinding) are typical of those used in this application.

These ground glass sheets may also find application in laminated glazing units and in double glazing units where a degree of privacy is desired. In this application it may be preferred to position the ground glass sheet so that the ground surface is not exposed to the atmosphere and does not attract dirt or other contamination.

Another potential use for the ground glass sheets of this invention is as moulds in the production of acrylic castings. Acrylic castings may be made by casting a resin onto the surface of a suitable mould and curing the resin. The cured resin carries any pattern which is on the surface of the resin. The glass sheets used in this application are preferably relatively thick; say 10 mm or 12 mm thick. Sheets ground on one side of the glass only are commonly applied although sheets ground upon both sides can be advantageously employed in equipment which is designed to permit the production of a cast resin on each side of the glass mould simultaneously.

Example 1

Plates of float glass 3.3 m×1.985 m×6.3 mm were laid on a series of moving grinding tables and separated from the tables by a cotton bench cloth. This glass was ground by passing under a series of seven grinding heads revolving at ~60 r.p.m, each fed with a sand slurry.

At the first head, the sand particle size was typically $300\mu$ diameter and at each subsequent head the average particle size was progressively reduced such that the seventh head was fed with sand particles typically of $50\mu$ diameter.

The surface of the float glass was transformed from a fire-polished surface better than 0.01 $\mu$m Ra to a 'satin' finish of surface roughnesses of 0.156; 0.062 and 0.072 (measured over three sample lengths) and a roughness of 09±0.1 $\mu$m Ra measured by a Rank Taylor Hobson Surtronic Four Plus instrument.

Over the same sample lengths the ground surface of the glass had an Sds value of 620, 670 and 610; an Sa value of 3.79, 3.03 and 2.03 $\mu$m and an Sku value of 2.27, 2.76 and 207. The ground glass had a transmission factor of 76%; a haze value of 90.2% and a clarity of 7.5%.

The plates were subsequently removed from the grinding tables for inspection and packaging.

Example 2

Plates of float lass 3.3 m×1.985 mm×6.3 mm were laid on a series of moving grinding tables and separated from the tables by a cotton bench cloth, were ground by passing under a series of twelve grinding heads revolving at 60 r.p.m., each fed with a sand slurry.

At the first head, the sand particle size was typically 300μ diameter and at each subsequent head the average particle size was progressively reduced such that the twelfth head was fed with sand particles typically of 20μ diameter.

The surface of the float glass was transformed from a fire-polished surface better than 0.01 μm Ra to a 'satin' finish of surface roughnesses 0.107, 0.107 and 0.111 (measured over three sample lengths) and a roughness of 0.4±0.1 μm Ra measured using a Rank Taylor Hobson Surtronic Four Plus instrument.

Over the same sample lengths the rough surface of the glass had an Sds value of 940, 960 and 960, an Sa value of 139. 0.51 and 0.61/μm and an Sku value of 1.91, 337 and 3.85. The ground glass had a transmission factor of 81.2%; a haze value of 85.9% and a clarity of 12.4%.

The plates were subsequently removed from the grinding tables for inspection and packaging.

Example 3

The procedures of examples 1 and 2 were replicated using rough cast wired glass as the starting materials. The products were translucent sheets having one smooth surface. The face which was not ground retained the original rough cast surface. In the first case the ground face of the glass had a satin smooth finish and a smoothness of 0.4±0.1 μM Ra and in the second case the ground face had a satin smooth finish and a smoothness of 0.9±0.1 μM Ra (measured using a Rank Taylor Hobson Surtronic Four Plus Instrument). In the first case the glass had a transmission factor of 69.3%; a haze of 91.0% and a clarity of 8.1 to. In the second case the glass had a transmission factor of 73.5%; a haze of 84.9% and a clarity of 14.9%.

What is claimed is:

1. A translucent ground glass sheet having a haze value of from 80% to 90% and an Ra value an the ground surfaces of from 0.05 μM to 5.0 μM.

2. The translucent ground glass sheet according to claim 1 wherein the Ra value on the pound surfaces is from 0.05 μM to 3.0 μM.

3. The translucent ground class sheet according to claim 1 which is ground upon one side only.

4. The translucent ground glass sheet according to claim 3 wherein the ground surface has density of summits value of from 500 to 1000 per $mm^2$.

5. The translucent ground glass sheet according to claim 3 wherein the ground surface has an Sa value of from 0.5 to 4.0 μM.

6. The translucent ground glass sheet according to claim 3 wherein the ground surface has a Kurtosis ratio of greater than 3.0.

* * * * *